UNITED STATES PATENT OFFICE.

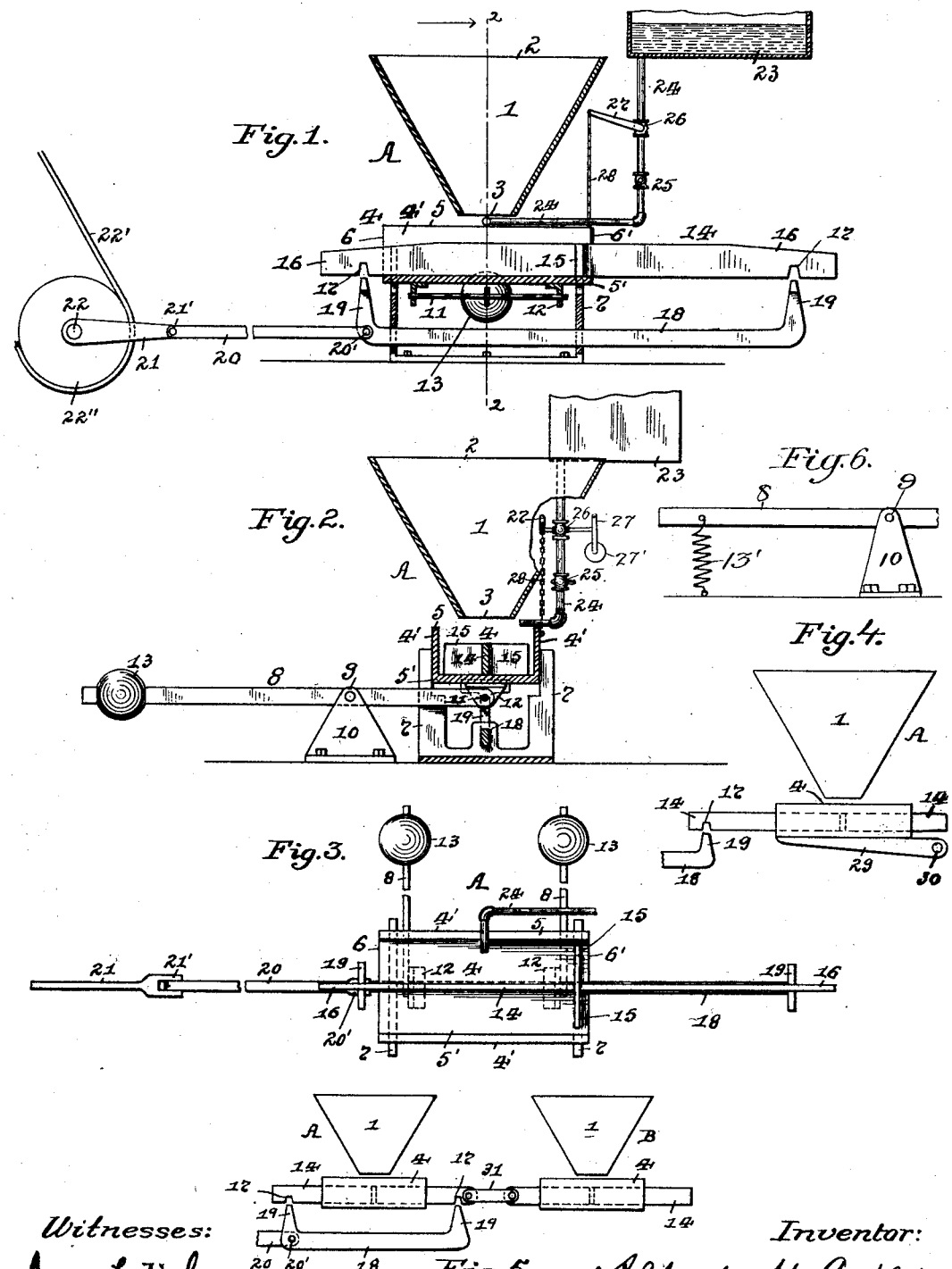

ALFRED M. ACKLIN, OF PITTSBURG, PENNSYLVANIA.

APPARATUS FOR FEEDING AND TEMPERING FOUNDRY-SAND.

SPECIFICATION forming part of Letters Patent No. 696,787, dated April 1, 1902.

Application filed October 23, 1901. Serial No. 79,688. (No model.)

*To all whom it may concern:*

Be it known that I, ALFRED M. ACKLIN, a resident of Pittsburg, in the county of Allegheny and State of Pennsylvania, have invented a new and useful Improvement in Apparatus for Feeding and Tempering Foundry-Sand, &c.; and I do hereby declare the following to be a full, clear, and exact description thereof.

My invention relates to feeding and tempering foundry-sand and the like, and has for its object to provide a cheap, simple, and effective device for such purposes which will automatically feed and temper the sand delivered thereto.

My invention consists, generally stated, in the novel arrangement, construction, and combination of parts, as hereinafter more specifically set forth and described, and particularly pointed out in the claims.

To enable others skilled in the art to which my invention appertains to construct and use my improved device, I will describe the same more fully, referring to the accompanying drawings, in which—

Figure 1 is a side view, partly in section, showing my improved device for feeding and tempering foundry-sand. Fig. 2 is a vertical central section on the line 2 2, Fig. 1, looking in the direction of the arrow. Fig. 3 is a top view of the feeder-pan, showing its connections and with the receptacle or hopper removed; and Figs. 4, 5, and 6 are views of other forms of my invention.

Like symbols of reference herein indicate like parts in each of the figures of the drawings.

The device is shown at A, and consists of the receptacle or hopper 1, which is of the ordinary approved construction, provided with the filling-opening 2 at its top and the discharge-opening 3 at its bottom. Extending under the discharge-opening 3 of the hopper 1 is the feeder-pan 4, which is provided with the sides 4' thereon, the open top 5, bottom 5', and open ends 6 6'. The feeder-pan 4 is supported within a frame 7 by means of a lever 8, fulcrumed at 9 in a post 10 and connected at one end to a bar 11, hung in angle-plates 12, secured to the bottom 5' of the pan 4, and the opposite end of said lever 8 carries a weight 13. Fitting within and resting upon the bottom 5' of the feeder-pan 4 is the feeder-bar 14, which is provided with the wings or scrapers 15, extending out on each side thereof and within the feeder-pan 4, while the ends 16 of the feeder-bar 14 extend beyond the open ends 6 6' of the pan 4 and are provided with notches or seats 17 at each end thereof. Extending through the frame 7 and under the pan 4 is the reciprocating bar 18, which is provided with the upwardly-projecting ends 19, and to this reciprocating bar 18 a connecting-rod 20 is pivoted at one end 20', while its opposite end is pivoted at 21' to a crank 21, mounted on a shaft 22, operated by a belt 22', applied to a pulley 22'' on said shaft 22 or to any source of power as desired. Supported adjacent to said hopper 1 in any suitable manner is the water-tank 23, which can be of any approved construction and to which a pipe 24 is connected, which leads to and opens over the feeder-pan 4, preferably under the discharge-opening 3 in the hopper 1, and said pipe 24 is provided with a regulator-valve 25 and a throttle-valve 26 therein, and to this throttle-valve 26 a lever 27 is attached, which is connected by a rod 28 to the feeder-pan 4.

The use and operation of my improved device for feeding and tempering foundry-sand and the like are as follows: The bar 18 within the frame 7 is reciprocated continuously during the time that it is desired to feed or temper the material by the rod 20, connected to the crank 21 or to any other means or source of power, and sand being brought to the hopper 1 by an elevator, conveyer, or any other suitable means is dumped or discharged into the hopper 1 through the filling-opening 2 at the top thereof and into the feeder-pan 4 through the discharge-opening 3 at the bottom of said hopper 1 and through the open top 5 of said pan 4. When a sufficient amount of sand has been placed within the hopper 1 and pan 4, the feeder-pan 4 will be depressed and carry downward with it the feeder-bar 14. As the feeder-pan 4 and feeder-bar 14 are thus lowered the notches or seats 17 in the ends 16 of the feeder-bar 14 will be caught in the upwardly-projecting ends 19 of the bar 18 as it is reciprocated, which will cause the feeder-bar 14 to be moved along within the feeder-pan 4 a sufficient distance so that the wings or scrapers 15 on said bar 14 will force along the sand dropped from the hopper 1 through the opening 3 into the pan 4 and discharge a predetermined quantity of the same alternately at the end 6 and the end 6' into any suitable conveyer or receptacle, and this operation will continue as long as there is sufficient sand in the hopper 1 and pan 4 to hold the pan 4 in the depressed position. After the supply of sand has thus been discharged from the pan 4 through the ends 6 6' thereof the pan 4 will be raised by means of the lever 8 and weight 13 and carry with it the feeder-bar 14, which will be disengaged from the ends 19 on the reciprocating bar 18, so that the pan 4 and bar 14 will be raised to their positions under the hopper 1 while another quantity of sand is being discharged from said hopper 1 into the pan 4. As the feeder-pan 4 containing the sand to be fed is thus lowered the throttle-valve 26 on the pipe 24 is opened through the lever 27, connected thereto, being lowered by the rod 28, connected to said lever 27 and pan 4, which will cause water to pass from the tank 23 through the pipe 24, throttle-valve 26, and regulator-valve 25 and be discharged into the charge of sand within the feeder-pan 4 or into the sand as it falls into the conveyer or receptacle below. Upon the return or raising of said pan 4 to the higher position the water will be shut off in the pipe 24 by the lever 27 on the throttle-valve 26 being raised to close said valve 26 by the rod 28 being connected to the pan 4 and so supply a sufficient quantity of water to the sand in the pan 4 to temper the same. In the absence of sand in the pan 4 said pan will be held in the highest position by means of the lever 8 and weight 13, and when it is in such position the throttle-valve 26 is closed by the rod 28.

In Fig. 4 I have shown the device as having the pan 4 provided with a bar 29, secured longitudinally thereon, which bar is pivoted at 30, and thereby does away with the weight 13 and lever 8, fulcrumed at 9, and in this case the feeder 14 can be provided with only a single seat 17 for engaging with one end 19 of the reciprocating bar 18.

It will be obvious that the bar 11 can be dispensed with and two levers 8, provided with weights 13, used and connected directly with the angle-plates 12 on the pan 4, such as is shown in Fig. 3, and that a weighted lever 27', such as is shown in Fig. 1, can be connected to the throttle-valve 26 to close the same in case a chain is used, as in Fig. 2, between the pan 4 and lever 27 in place of the rod 28, and that other means than levers and weights can be used on the feeder-pan, so that it may be depressed when a sufficient amount of material has been placed within the same and hopper, such as the spring 13', (shown in Fig. 6,) which is connected at one end to the lever 8 and to the base or floor or any other desired place at its opposite end, which spring 13' is used in place of the weights 13 and will return the pan 4 to place after it is depressed. Springs may also be used directly beneath the pan for supporting the same, if desired.

The device can be used for the mixing and feeding of other materials than sand—such as cement, &c.—which also would require water to be discharged into the same to make the same plastic, such as is shown in Fig. 5, in which another device B is connected to A by a link 31, pivoted to the ends of each feeder-bar 14, and the materials fed from the feeder-pans 4 by a single reciprocating bar 18, engaging with one of the bars 14. In this case the cement can be fed into the device B and the sand into the device A and such materials fed from the ends of the feeder-pans 4 by the bars 14 into a conveyer or receptacle, where they would receive the water or the water could be fed into the pans as desired.

It will be evident that the pan 4 can be attached to the hopper 1 and both lowered and raised together, if desired, and various other modifications, changes, and uses may be resorted to without departing from the spirit of the invention or sacrificing any of its advantages.

The device is simple and positive in its construction and operation, and by its use a fixed amount of material can be discharged or delivered at each stroke of the device and a predetermined amount of water can be delivered to such material.

What I claim as my invention, and desire to secure by Letters Patent, is—

1. In a device for feeding and tempering foundry-sand, &c., the combination with a receptacle or hopper, of a feeder-pan under said hopper, a feeder-bar within said feeder-pan, means engaging with said feeder-pan to lower and raise the same, a reciprocating bar having projections thereon engaging with recesses in the feeder-bar to move the same and discharge the material from said pan, and means for reciprocating said bar.

2. In a device for feeding and tempering foundry-sand, &c., the combination with a receptacle or hopper, of a feeder-pan under said hopper, a feeder-bar within said feeder-pan, a fulcrumed lever pivoted to said pan and provided with a weight thereon to raise the pan, a reciprocating bar adapted to engage with the feeder-bar to move the same and discharge the material from said pan, and means for reciprocating said bar.

3. In a device for feeding and tempering foundry-sand, &c., the combination with a receptacle or hopper, of a feeder-pan under said hopper, a feeder-bar within said feeder-pan, a fulcrumed lever pivoted to said pan and provided with a weight thereon to raise the pan, a reciprocating bar having projections thereon engaging with recesses in the feeder-bar to move the same and discharge the material from said pan, and means for reciprocating said bar.

4. In a device for feeding and tempering foundry-sand, &c., the combination with a receptacle or hopper, of a feeder-pan under said hopper, a feeder-bar within said feeder-pan, means for lowering and raising said feeder-pan, a reciprocating bar adapted to engage with the feeder-bar to move the same and discharge the material from said pan, means for reciprocating said bar, and means for supplying water to said material.

5. In a device for feeding and tempering foundry-sand, &c., the combination with a receptacle or hopper, of a feeder-pan under said hopper, a feeder-bar within said feeder-pan, means for lowering and raising said feeder-pan, a reciprocating bar adapted to engage with the feeder-bar to move the same and discharge the material from said pan, means for reciprocating said bar, and a pipe connected to a water source and adapted to supply water to the material.

6. In a device for feeding and tempering foundry-sand, &c., the combination with a receptacle or hopper, of a feeder-pan under said hopper, a feeder-bar within said feeder-pan, means for lowering and raising said feeder-pan, a reciprocating bar adapted to engage with the feeder-bar to move the same and discharge the material from said pan, means for reciprocating said bar, a pipe connected to a water source and provided with a valve therein, and connections between said pan and valve for opening and closing said valve to supply water to the material.

7. In a device for feeding and tempering foundry-sand, &c., the combination with a receptacle or hopper, of a feeder-pan under said hopper, a feeder-bar within said feeder-pan, means for lowering and raising said feeder-pan, a reciprocating bar adapted to engage with the feeder-bar to move the same and discharge the material from said pan, means for reciprocating said bar, a pipe connected to a water source and provided with a valve therein, a lever on said valve, and a bar or chain connected to said pan and lever for opening and closing said valve to supply water to the material.

In testimony whereof I, the said ALFRED M. ACKLIN, have hereunto set my hand.

ALFRED M. ACKLIN.

Witnesses:
J. N. COOKE,
J. L. TREFALLER, Jr.